United States Patent [19]
Duckett

[11] Patent Number: 5,368,104
[45] Date of Patent: * Nov. 29, 1994

[54] HORSESHOE

[76] Inventor: Dave Duckett, 709 Tennis Ave., Ambler, Pa. 19002

[*] Notice: The portion of the term of this patent subsequent to Nov. 24, 2009 has been disclaimed.

[21] Appl. No.: 980,659

[22] Filed: Nov. 24, 1992

Related U.S. Application Data

[63] Continuation-in-part of Ser. No. 288,796, Dec. 21, 1988, Pat. No. 5,165,481.

[51] Int. Cl.$^5$ ............................................. A01L 1/04
[52] U.S. Cl. ..................................................... 168/4
[58] Field of Search ................................. 168/4, 17, 29

[56]   References Cited

U.S. PATENT DOCUMENTS

| | | | |
|---|---|---|---|
| 146,146 | 1/1874 | Russell | 168/4 X |
| 1,508,129 | 9/1924 | Sanders | 168/42 |
| 3,050,133 | 8/1962 | Ketner et al. | 168/31 X |
| 5,165,481 | 11/1992 | Duckett | 168/4 |

FOREIGN PATENT DOCUMENTS

| | | | |
|---|---|---|---|
| 820624 | 11/1937 | France | 168/29 |
| 472614 | 12/1935 | United Kingdom | 168/4 |
| 533916 | 2/1941 | United Kingdom | 168/4 |

Primary Examiner—Robert P. Swiatek
Attorney, Agent, or Firm—Jack E. Day

[57]   ABSTRACT

A horseshoe intended for use in competitive situations. It is specifically designed to conform to the anatomical structure of the horse's hoof, and to have little effect on the performance of the horse, either due to wear of the shoe or growth of the horse. It includes:

a toe sloping upwardly at the laterally extended intersection of the lower surface of the shoe and a plane, containing the axis of articulation of the hoof and extending downwardly and forwardly to the intersection;

a wear-resistant area, located at the intersection, by means of a wear-resistant insert or material applied thereto, the area being rearwardly curved;

a perpendicular web at the rear of the toe portion for added support;

a wedge shape to the mid-sections of the arms to improve withdrawal from turf, etc.;

rounded outer edges of the heel ends of the arms, widened arms, and a relieved inner surface of the toe portion, to give greater cushioning during strenuous activities, such as running, jumping, and the like; and an upper surface which is substantially planar.

12 Claims, 4 Drawing Sheets

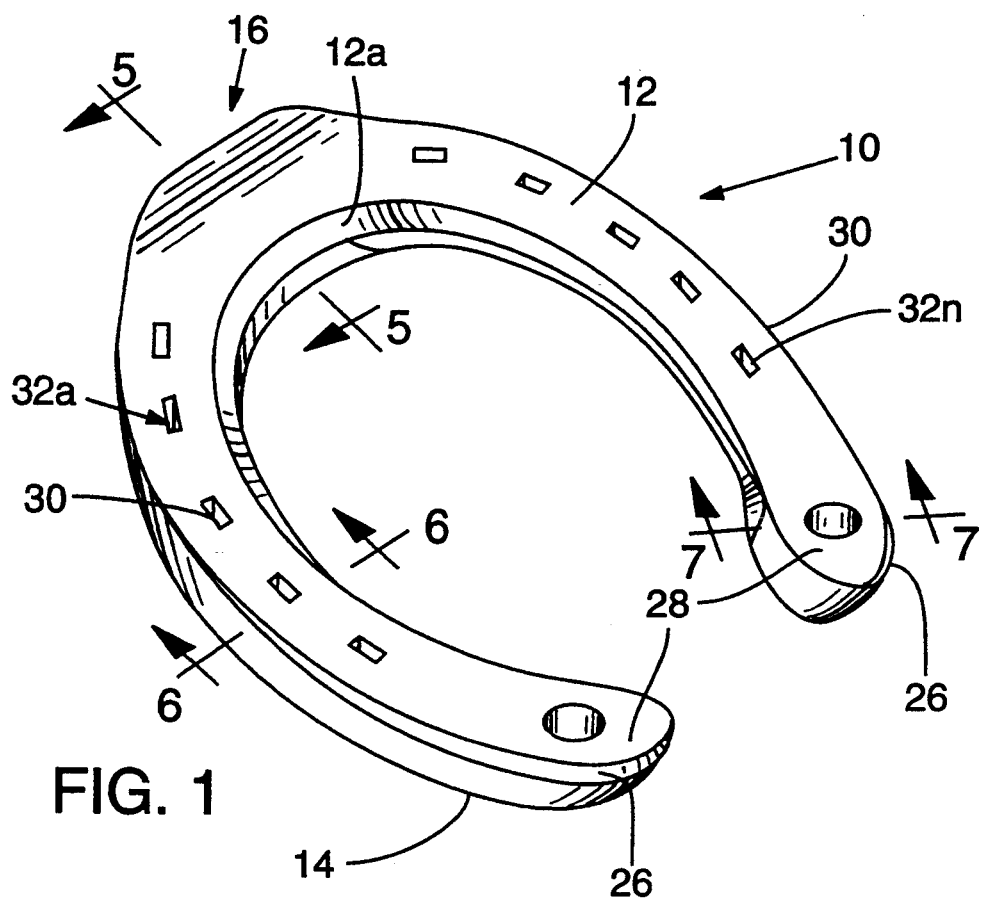
FIG. 1
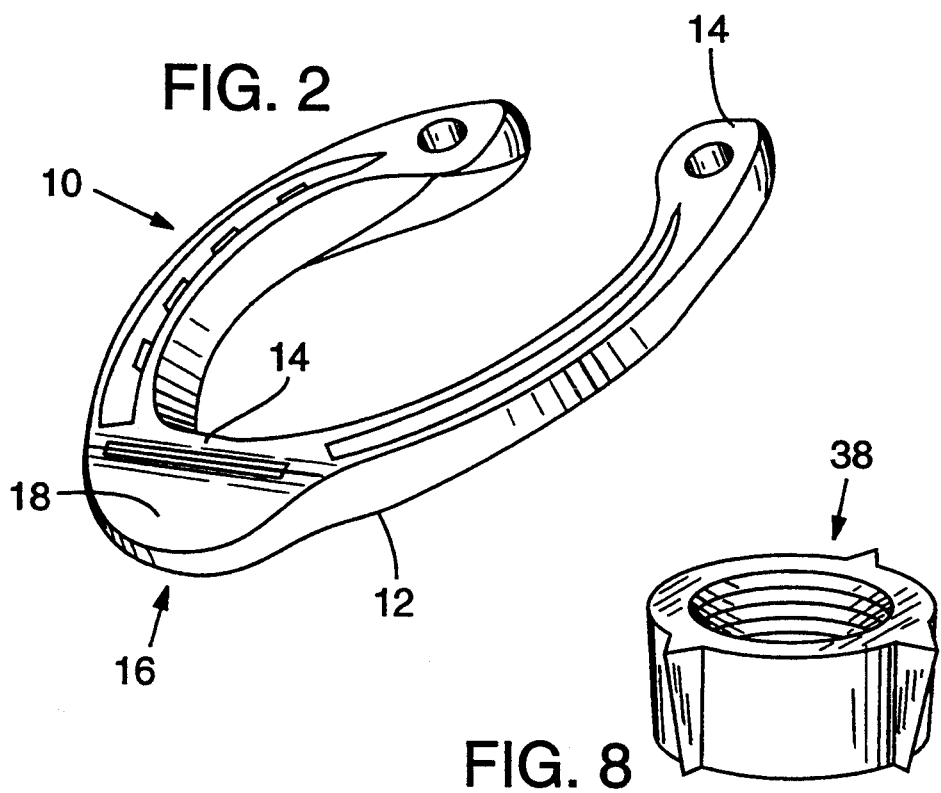
FIG. 2
FIG. 8

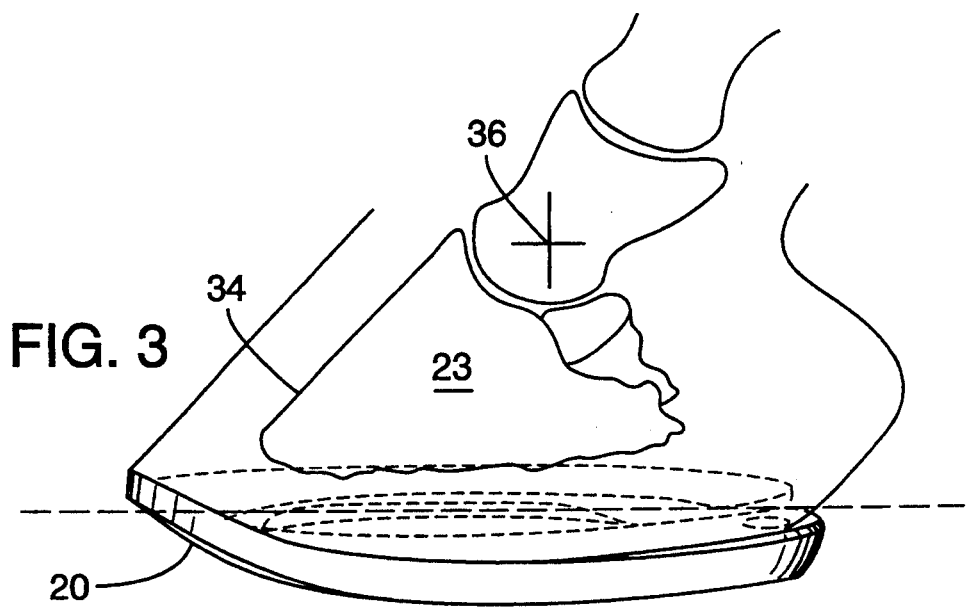
FIG. 3
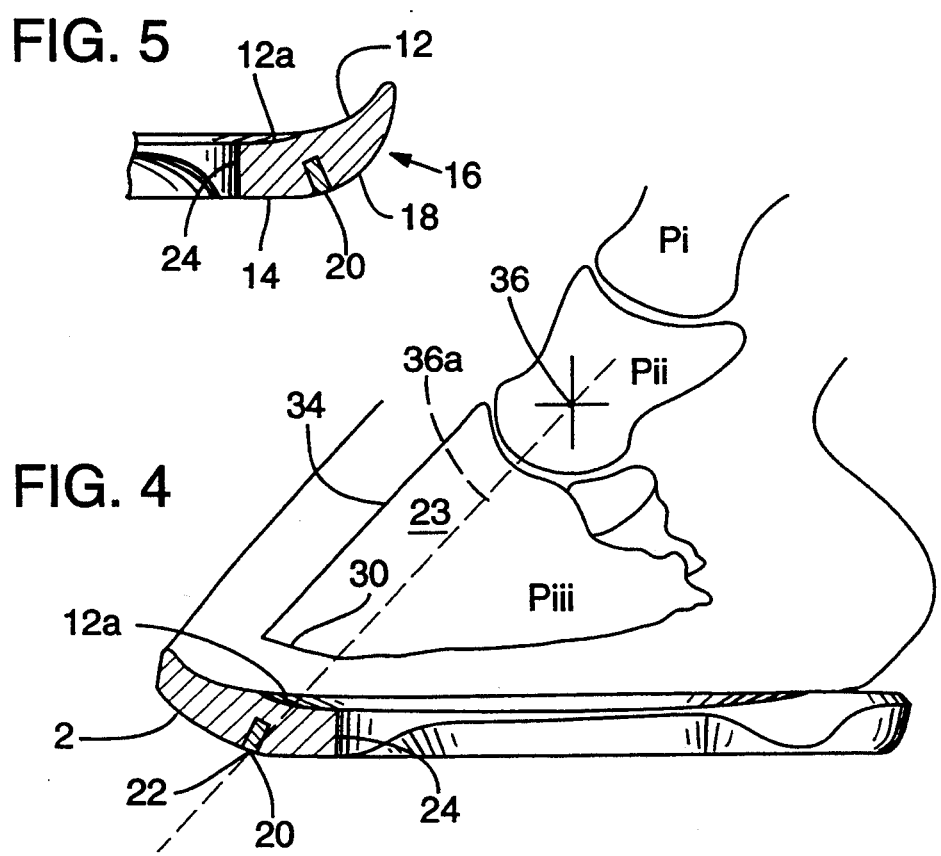
FIG. 5
FIG. 4
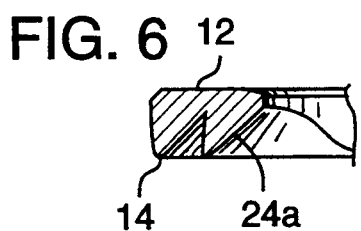
FIG. 6
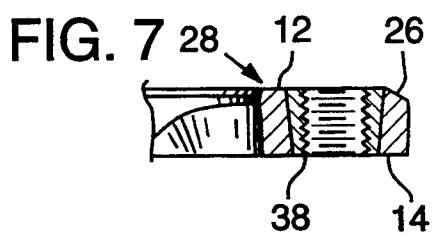
FIG. 7

HORSESHOE

This application is a continuation-in-part of application No. 07/288,796, filed Dec. 21, 1988, for IMPROVED HORSESHOE, and issuing Nov. 24, 1992 as U.S. Pat. No. 5,165,481.

The present invention relates to horseshoes in general and, in particular, to an improved horseshoe which conforms more closely than previous shoes to the anatomical structure and articulation of a horse's leg and hoof, and its use is therefore especially beneficial in circumstances such as are encountered in the show ring or in racing.

BACKGROUND OF THE INVENTION

As might be expected, the art of horseshoe structure is a crowded art which includes several hundred patents granted over a period of more than one hundred years. Many of them reveal efforts to deal with the problems solved by the present invention, but without an adequate understanding of the precise anatomical relationships involved.

Wilkinson U.S. Pat. No. 61,974 discloses a shoe which is rounded on the lower surface, and has steel plates attached to the toe and heels thereof, which are the points of greatest wear. However, the disclosure reveals no awareness of the anatomical factors which are necessary to be considered in the shape and structure of an effective shoe.

Bryden U.S. Pat. No. 155,362 discloses a shoe which dispenses with caulks (which were evidently prevalent in shoes at that time) but which gives the same results as shoes with caulks. Some awareness is revealed of some of the effects of shoe structure upon the muscles and tendons of the animal, and the rolled front surface on the toe of this shoe is an effort to take into account those effects. However, it does not conform to the anatomical structure of the foot.

Read U.S. Pat. No. 196,479 discloses a shoe intended to deal with a specific ailment of horses ("contraction of the feet"). The bottom of this shoe is rounded, but this rounding is not related to the specific anatomical structure of the horse's foot.

Dellinger U.S. Pat. No. 570,278, discloses a shoe which is thinned along the inner margin of its upper surface. However, this thinning is not discussed, nor is any role for it but, from the description given of the shoe generally, it seems to be for the purposes of weight reduction. No awareness is revealed that this structure might have physiological effects on the functioning of the hoof. There is no other feature of this shoe which is relevant to the novelty of the present invention.

Several early patents disclose caulks for horseshoes to be applied at different points thereof, but these are for the purpose of providing traction on difficult surfaces. None of them discloses an insert of abrasion-resistant material to be embedded in the sole of the shoe at the points of greatest wear, or an application of such material to be applied to the same area on the surface of the sole of the shoe, or even an awareness that there is a desirable anatomical reason for the location of a wear-resistant area at those points:

Weyburn U.S. Pat. No. 812,966 discloses a caulk with a shape similar to that of the insert described herein. However, the structure and function of this caulk is different than the structure and function of the caulk of the present invention, as will be described hereinafter. The shoe of the Weyburn disclosure has no other features in common with the shoe of the present invention:

Ashton U.S. Pat. No. 3,780,810 discloses a shoe which is formed by casting and annealing to avoid internal stresses which he says are common with shoes made by the standard methods. The Ashton shoe has no points in common with the shoe of the present invention, The disclosure says, in fact, that some of the features incorporated into the present invention are defects;

Ovnicek U.S. Pat. No. 4,721,165 discloses a shoe which is claimed to be more scientifically designed than previous shoes. Although some of the same desirable goals are stressed as are stressed in the present invention, Ovnicek does not show the same features as herein, as will be discussed in greater detail hereinafter. The principal shortcoming of Ovnicek's horseshoe is that the natural growth of the hoof destroys the relationships disclosed and claimed therein, and thus nullifies the advantages claimed therefor.

None of the references given hereinbefore discloses a shoe having a combination of features such as is disclosed and described in the present invention, or discloses all of the principal features which are considered important herein.

SUMMARY OF THE PRESENT INVENTION

It is well-known to those skilled in the art of farriery and veterinary science that the purpose of horseshoes is to provide protection against injurious substances becoming lodged in horses' hooves, and against cuts, bruises, and other injuries thereto and, under certain circumstances, to provide more traction than unshod hooves generally provide.

What have been less well-recognized goals in the art is that a horseshoe should interfere as little as possible with the natural mechanical functioning of the horse's foot, and should not exert on the muscles and tendons thereof any strain, pressure or other unnatural force to which the horse is unused.

What has not been recognized heretofore in the art is that two natural processes enter into the functioning of a horseshoe when affixed to a hoof, and thereby interfere with the attainment of these purposes and goals:

1. the growth of the hoof itself; and
2. the wearing away of the horseshoe.

The present invention discloses a horseshoe which is intended to eliminate the interference, by the natural processes of growth and wear, with the attainment of these purposes and goals. It is especially intended for use in the highly stressed circumstances of competition, such as in the exhibition arena, where the horse is expected to perform actions which may be unnatural to it, and where such unnatural actions may have the potential to bring about serious injury to the horse and/or rider if they are not performed properly, that is, in accordance with the natural anatomical functioning of the horse's leg and hoof.

That is, the horsehoes of the present invention are intended to have as little effect on the performance of a horse wearing them, as if the horse were not wearing shoes under the same circumstances, and that this non-interference with performance remain the same as the horse's hooves grow, or as the shoes wear away due to the abrasive qualities of the performing surface. These advantages are obtained without the distinct disadvantages (at times) of not wearing shoes.

The improved horseshoe of the present invention has the general shape which is familiar to, not only those skilled in the art, but nearly every person anywhere there are horses. However, in nearly every other way, the features of this familiar shape are subtly modified in accordance with the teachings herein, to achieve the desirable purposes and goals of this shoe, which is non-interference with the natural functions of the hoof.

Three major modifications combine to make this shoe a novel and sigificant advance over existing shoes:

1. the first major modification of this improved horseshoe is an upwardly-sloping toe, which protects the tender tissues of the horse's hoof from injury. The rounded intersection of the front surface of this upwardly-sloping toe with the planar lower surface may hereinafter be called the "balance" point, and the upwardly-sloping toe, including the balance point, may also be referred to as a "rolled toe" hereinafter. The balance point is substantially transverse to the longitudinal axis of the shoe (and the foot) and parallel to the axis of articulation or rotation of third phalanx bone $P\overline{\overline{iii}}$ about second phalanx bone $P\overline{\overline{ii}}$ of the foot structure. It is, on the longitudinal axis, at the intersection of the lower surface of the shoe with a plane which, when extended upwardly, passes through and contains said axis of articulation, and lies substantially parallel to a line extending down the dorsal, or upper, surface of phalangeal bone $P\overline{\overline{iii}}$ of the foot and on the longitudinal axis thereof. The novel placement of the balance point means that it maintains its normal anatomical relationship to the axis of articulation of $P\overline{\overline{iii}}$ about $P\overline{\overline{ii}}$ during hoof growth or shoe wear. The improved shoe of this continuation-in-part application provides for an upper surface on the shoe which is substantially planar, giving the added advantage that the farrier can "tailor" this modified shoe to the individual horse's hoof;

2. the second major improvement of this improved shoe is that a wear-resistant area is located along the balance point of the rolled toe, as defined hereinbefore. This area of wear resistance may be obtained by:
   a. the insertion of a wear-resistant body of material into the shoe; or
   b. by the application of wear-resistant material to the surface of the shoe along that line.

The steel insert and balance point act as a fulcrum, with respect to the ground, of the hoof in its distal, or rearward, articulation during the forward movement of the horse. Because of its placement, it does not change its relationship to the anatomical structure of the hoof during hoof growth of shoe wear. The insert of the improved shoe of the continuation-in-part application can have therein a slight arc, the center of which is to be located on the balance point at its intersection with the longitudinal axis of the hoof;

3. The third major improvement of the present invention is that the inner web of the toe portion of the shoe, in cross-section along the longitudinal axis, is substantially perpendicular to its lower surface on the longitudinal axis thereof, giving additional support and stiffness in this area. However, this shape "fairs" rapidly into a wedge-shape at the sides of the shoe, as the point of cross-section moves outwardly from the longitudinal axis, as explained more completely hereinafter.

These three major improvements combine to provide a shoe which reduces, to the point of elimination, interference with the natural functioning of the foot due to wear of the shoe and/or growth of the hoof, improves support to the foot, and improves traction.

Further improvements include:

4. rounding the outer edges of the heel ends of the sides or "arms" of the shoe, thereby:
    thereby gaining additional width on the lower surfaces for affixing thereto studs or other traction devices;
    providing additional space to insert therein removable threaded plugs for attaching said studs or traction devices; and
    providing additional support to the heel and posterior portions of the foot;

5. shaping the midsections on the lower surface to a wedge shape, for improved extraction from turf or similar surfaces;

6. relieving, or "seating", the inner margin of the upper surface at the forward section of the web, giving a tolerance area between the foot and shoe, to relieve pressure on the descending sole of the foot under conditions of great physical stress. Seating gives a cushioning effect, especially during running or jumping, by widening the web substantially on the sides, thereby giving greater support to the outer margins of the foot.

The improved horseshoe of the present invention brings together features which complement the anatomical structures of the hoof. The toe structure encourages the articulation of the foot to produce a fluid stride, without distorting the natural movement of its skeletal structures. Those skilled in the art will readily visualize how the shoe assists the mechanical functioning of the foot by reducing the length of the toe, thus alleviating the additional stress the increased leverage thereof would impose upon the foot and limb.

The shoe is attached by traditional or modern methods to the ventral or lower surface of the hoof, after the toe of the hoof has been prepared to snugly accomodate the rear surface of the upwardly sloped toe of the shoe. The upwardly sloped toe serves to provide resistance to any forces tending to push the shoe rearward on the hoof and thus serves to keep the rolled toe in proper relationship to the axis of articulation of the hoof. This resistance to rearward movement is in addition to that provided by nails or cement.

However, the substantially planar upper surface of the improved shoe permits the farrier to adjust this upper surface to fit the requirements of a particular animal.

Both the front and rear surfaces of the upwardly sloped toe portion make a substantially obtuse angle with the lower and upper surfaces of the shoe, respectively, and both are substantially parallel to the axis of articulation of third phalanx bone $P\overline{\overline{iii}}$ about second phalanx bone $P\overline{\overline{ii}}$. Thus, the shoe gives protection not only to the ventral surface of the foot, but also to the toe area and underlying sensitive structures. This protection is effective throughout the complete cycle of stride, over all types of terrain. This shoe structure combines the benefits of extra protection and longer wear, providing longer shoe life than any shoe presently available.

The rolled toe provides an extra advantage over the unshod hoof or one shod with a conventional shoe, in that it enables the shoe to rock on a transversely extended rounded edge instead of on a single tangent point, giving better lateral stability to the hoof. Especially is this true of the improved shoe, where the arced insert permits the horse's hoof to roll slightly as the shoe wears, in accordance with the natural functioning of the foot.

Other benefits will become apparent to those skilled in the art as the following detailed description is studied in conjunction with the drawings herein.

BRIEF DESCRIPTION OF THE DRAWINGS

FIG. 1 is a oblique general view of the upper surface of the improved horseshoe of the present invention.

FIG. 2 is a oblique general view of the lower surface of the present invention.

FIG. 3 is a view in phantom X-Ray, from the left side, of a horse's hoof with the improved horseshoe of the present invention affixed thereto.

FIG. 4 is a view in longitudinal-section, from the left side and along the longitudinal axis, of FIG. 3.

FIG. 5 is a view in cross-section along the lines 5—5 of FIGS. 1 and 9, on the longitudinal axis thereof.

FIG. 6 is a view in cross-section along the lines 6—6 of FIGS. 1 and 9.

FIG. 7 is a view in cross-section along the lines 7—7 of FIGS. 1 and 9.

FIG. 8 is a view of a threaded plug to be inserted into the heel portions of the horsehoe arms.

DETAILED DESCRIPTION OF THE PRESENT INVENTION

Figure 9:
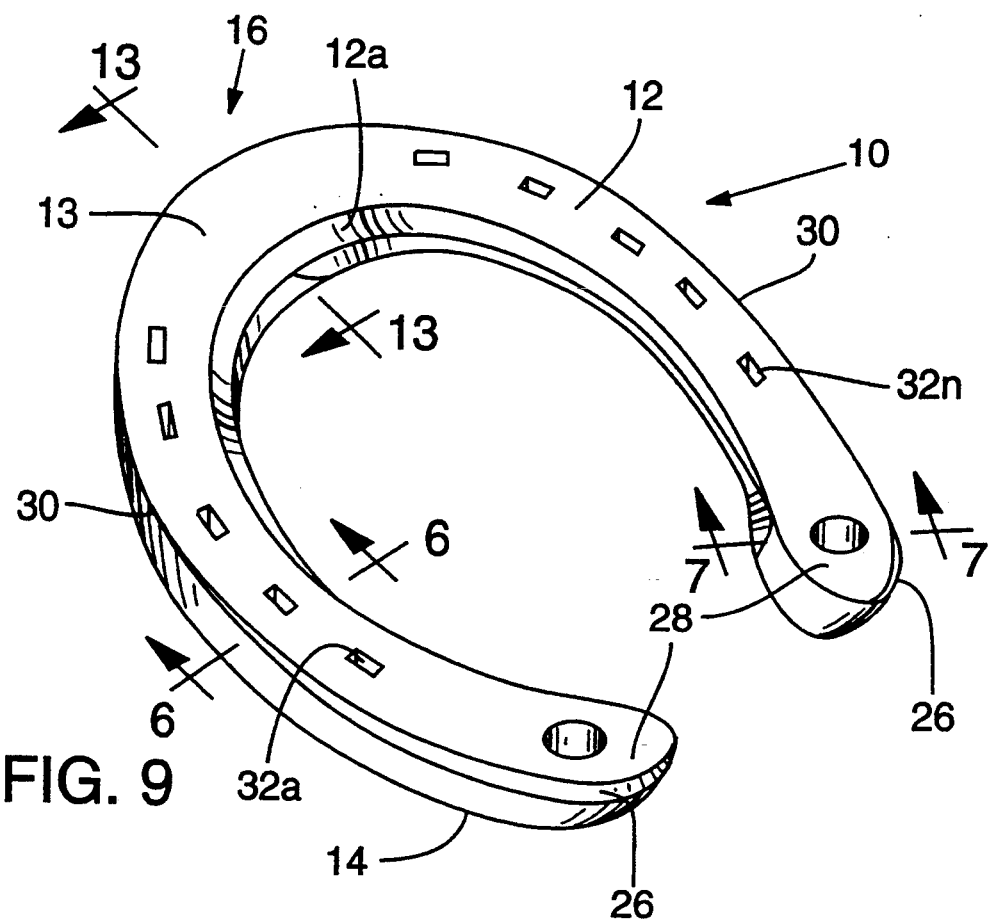
FIG. 9 is a oblique general view of the upper surface of the improved horseshoe of the present invention, disclosing the substantially planar upper surface.

Turning now to FIGS. 1 and 2, we see oblique views of the present invention 10, an improved horseshoe and the novel features thereof.

Horseshoe 10 includes upper surface 12 and lower surface 14, and upwardly sloping toe 16, which includes:

a. front sloping surface 18, intersecting lower surface 14 of shoe 10 at a substantially obtuse angle; and b. rear curved surface 12a, an extension of upper surface 12.

Upwardly sloping toe 16 is also called rolled toe 16, hereinafter. Further details of its structure can be seen in FIG. 2, where shoe 10 is inverted, with lower surface 14 uppermost, and sloping toe 16 extending downward.

FIG. 5 is a view in cross-section on the longitudinal axis of shoe 10, along the lines "5—5" of FIGS. 1 and 9, disclosing the shape thereof. Sloping surface 18 makes a substantially obtuse angle with lower surface 14 at rounded intersection 20, and is hereinafter called balance point 20, which is substantially transverse to the longitudinal axis of the shoe, and is substantially parallel to the axis of articulation or rotation of third phalanx bone P$\overline{\overline{iii}}$ about second phalanx bone P$\overline{ii}$. As seen clearly in FIGS. 3 and 4, balance point 20 is at the intersection of:

a. lower surface 14 of shoe 10; and b. a plane:
1. containing the axis of articulation of third phalanx bone P$\overline{\overline{iii}}$ about second phalanx bone P$\overline{ii}$, and extending downwardly and forwardly therefrom; and
2. being parallel to the dorsal, or upper, surface of P$\overline{\overline{iii}}$ along the longitudinal axis of the foot; and c. upwardly sloping surface 18.

The reasons for this structure are fully explained in detail hereinafter.

A further major feature of improved shoe 10, when made of a lightweight material such as an aluminum alloy, is insert 22, which is of steel or other abrasion-resistant material, and which is placed along balance point 20. This can be seen most clearly in FIGS. 2 and 5.

FIGS. 10, 11, 12 and 13 also disclose improved insert 22a, which has a slight arc therein, so that as the normal rolling of the animal's hoof from side-to-side wears shoe 10 along balance point 20, especially due to vigorous turning manuevers during hard riding, the normal functioning of the foot is not inhibited.

The abrasion-resistant function of insert 22 is also obtainable by applying, by any of several well-known processes, to the surface of the shoe 10 along balance point 20, an abrasion-resistant material which retards wear of the shoe at that point. When insert 22 is referred to hereinafter, it should be interpreted as referring to this embodiment also.

Insert 22 is preferably straight and flush with the shoe's lower surface 14. However, it can extend slightly therefrom for additional traction.

Figure 10:
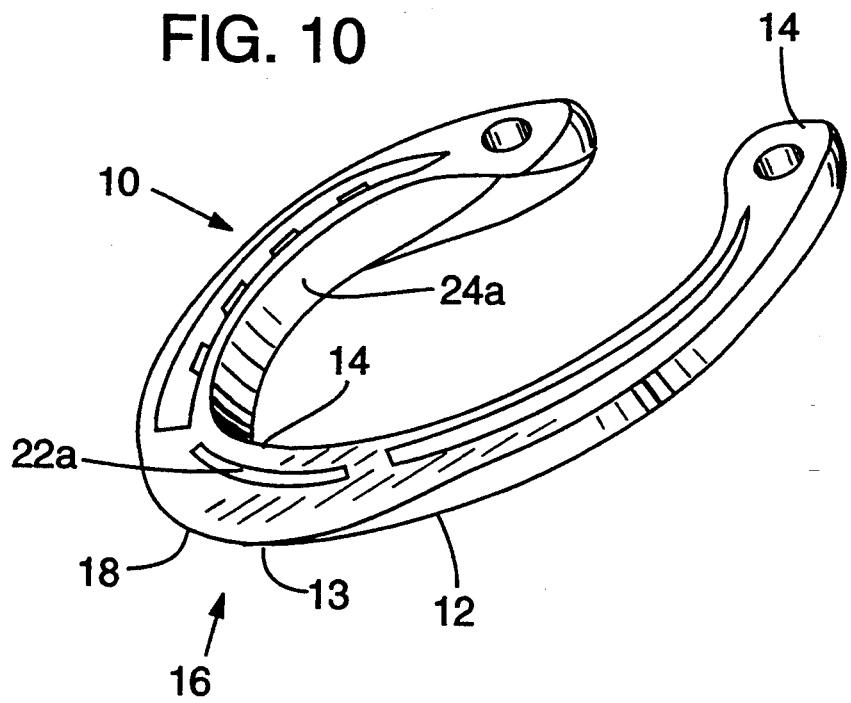
FIG. 10 is a oblique general view of the lower surface of the present invention, disclosing the arced insert.
Figure 11:
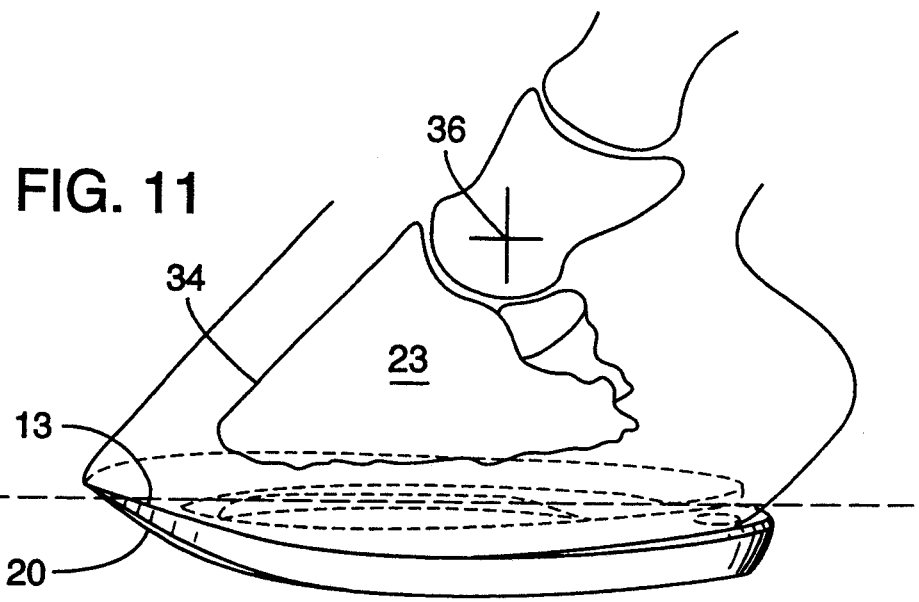
FIG. 11 is a view in phantom X-Ray, from the left side, of a horse's hoof with the improved horseshoe of the present invention affixed thereto, disclosing the substantially planar upper surface thereof.
Figure 12:
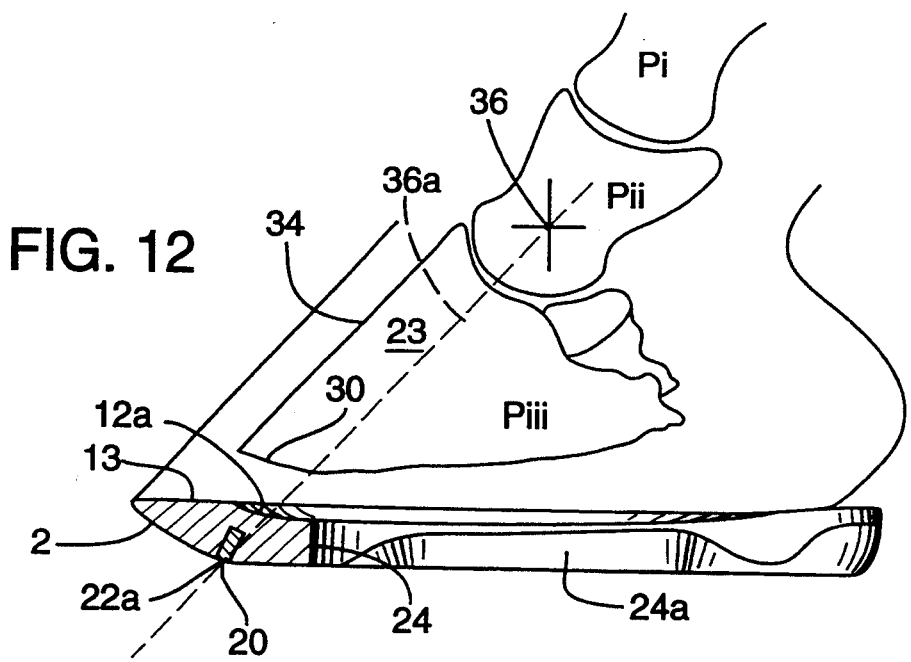
FIG. 12 is a view in longitudinal-section, from the left side and along the longitudinal axis, of FIG. 11.
Figure 13:
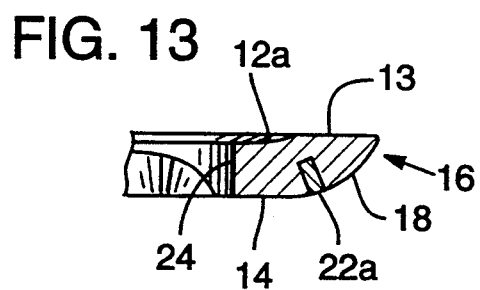
FIG. 13 is a view in cross-section along the lines 13—13 of FIG. 9, on the longitudinal axis.

As stated hereinbefore, insert 22a, disclosed in FIG. 10 in the improved shoe, is slightly curved to permit more uniform functioning during wear of shoe 10. It can also protrude, if desired.

Yet another major feature of improved shoe 10 is that inner surface 24 of toe portion 16 is substantially perpendicular to lower surface 14 on the longitudinal axis of the shoe, as disclosed in cross-section in FIG. 5. As this cross-section moves outwardly and around the side arms 30 of shoe 10, surface 24 rapidly fairs into an outwardly sloping surface 24a, forming a cross-section at the sides, as disclosed in FIG. 6, and as discussed in detail hereinafter.

Further improvements include the rounded outer surfaces 26 of heel ends 28, as disclosed in FIG. 7, gaining additional width on the lower surface 14. Threaded plugs 38 can be inserted into heel-ends 28, for the screwing therein of traction devices when desired or required. When such are not used, threaded blank plugs can be screwed therein, to avoid the threaded holes from becoming filled with unwanted debris.

FIGS. 1 and 5 also disclose the relieving, or "seating", of inner margin 12a of upper surface 12 at the forward section of the web, giving a tolerance area between the foot and shoe. The web is further widened substantially on the sides, as seen most clearly in FIGS. 1 and 6, compared to existing shoes.

Upper surface 13 of shoe 10, as disclosed by FIGS. 9–13, is substantially planar, to permit a farrier to adapt the shoe to a particular horse's hood or for use under specified circumstances.

Finally, shoe 10 can be affixed to the hoof, by traditional nailing, or by some method of cementing. Nail holes 32a . . . 32n are located to insure that a competent farrier or veterinarian, after preparing the toe of the hoof to snugly receive the shape of upwardly sloping toe 16 of the shoe, can place shoe 10 on the hoof so that balance point 20 is located in an imaginary plane which is parallel to the dorsal surface 34 of $P_{\overline{iii}}$ along the longitudinal axis thereof and extending downwardly and forwardly from axis of articulation 20. This means that balance point 20 is parallel to axis of articulation 36, and remains so during growth of the hoof or wearing of the shoe, so that, as the foot grows, the balance point remains in the same axial position with respect to the axis of articulation between $P_{\overline{iii}}$ and $P_{\overline{ii}}$.

Those skilled in the art are extremely careful that the nails do not penetrate a sensitive portion of the foot, and lame the horse.

The benefits of these improvements are now to be explained in detail.

Lower surface 14 is of great importance, as it bears the descending force of the hoof under conditions of great stress. At its rear extremities, it provides means to affix jumping studs or wear resistant plugs. Its novelty is to give support to the weight-bearing area of the distal portion of the limb.

Rolled toe 16 has several benefits. In addition to providing physical protection to the frontal portion of the hoof, line 20 acts as a fulcrum for the hoof, with respect to the ground, in its distal, or rearward, articulation during the forward movement of the horse. Since it is on a line 36a through the axis of rotation of $P_{\overline{iii}}$ about $P_{\overline{ii}}$ and parallel to the dorsal surface of phalanx bone $P_{\overline{iii}}$, and since the lateral extension of line 20 is parallel to the axis of rotation, it bears the same relationship to the motion of the foot as does the unshod hoof, without regard to the growth of the hoof or the wearing away of the shoe.

The Ovnicek patent places much stress on the proper placement of transverse insert 70 thereof. However, it is disclosed as being located vertically below the tip T of coffin bone C (col. 3, lns. 37-39), and when hoof growth takes place, the position of Ovnicek's insert will change with respect to the axis of articulation of $P_{\overline{iii}}$ about $P_{\overline{ii}}$, changing the natural mechanical functioning of the hoof. In contrast, the present invention places the insert on a line 36a which:
1. extends through the axis of articulation of $P_{\overline{iii}}$ about $P_{\overline{ii}}$; and
2. is parallel to the dorsal surface of $P_{\overline{iii}}$. This means that the growth of the horse's hoof with the shoe in place does not alter the geometric relationships of the bones of the hoof as the horse walks, trots, or gallops.

A further advantage of the present invention is that the transversely extended line of contact along balance point 20 with the surface gives somewhat greater lateral stability than does even the unshod hoof. Insert 22 is preferably straight and set flush with lower surface 14, but can protrude slightly to give a tractive benefit, if desired. Insert 22 has a substantially greater abrasion resistance than the body of the shoe, e.g., if shoe 10 were fabricated of a light-weight aluminum alloy, insert 22 could be of steel, providing extended shoe life at the point of greatest wear. Although shoes of steel or other materials such as titanium, would not normally need wear protection, even they could incorporate inserts of the various carbides, providing even greater wear resistance if desired.

The substantially perpendicular surface 24 gives additional support and stiffness in this area to shoe 10. However, the major portions of the arms of the shoe have a wedge-shaped section, obtained by rapidly fairing surface 24 into a sloping shape, as disclosed in cross-section in FIG. 6, making it easier for shoe 10 to be withdrawn from turf or surfaces of similar character.

Widening the heel ends and rounding the outer edges thereof, as disclosed in FIG. 7, gains additional width on the lower surfaces for affixing thereto studs or other traction devices, and provides additional support to the heel and posterior portions of the foot.

Relieving, or "seating" the inner margin of the upper surface at the forward section of the web, as disclosed in FIG. 1, gives a tolerance area between the foot and shoe, which relieves pressure on the descending sole of the foot under conditions of great physical stress such as might be encountered in racing. It gives a cushioning effect as the hoof descends to the running surface.

Widening the web substantially on the sides, as seen most clearly in FIG. 6, gives greater support to the outer margins of the foot, again relieving pressure thereon and reducing the possibility of injury during excessive exertion.

The result of this novel combination of major and secondary features is to provide a shoe giving significant additional traction over existing shoes; less pressure on the portions of the hoof in contact with the shoe; greater comfort to the horse; and minimal interference with the natural motion of the foot.

The shoe is attached by modern or traditional methods to the ventral or lower surface of the hoof. The upwardly sloped rear surface 18 of toe 16, being parallel to axis 26 of the phalangeal articulation, gives protection not only to the ventral surface of the foot, but also to the toe area of the hoof and underlying sensitive structures, which is effective throughout the cycle of stride and over all types of terrain. This shoe structure combines the added benefits of extra protection and longer wear, having longer life than any shoe presently available.

The substantially planar upper surface 13 of the improved shoe more easily permits shoe 10 to be adapted to circumstances of an animal or for a particular use.

Those skilled in the art will undoubtedly be able to see changes and modifications which can be made which will not, however, avoid the scope and intent of the present invention.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What I claim as my invention is:

1. A horseshoe, to be affixed to the distal surface of a horse's hoof having a longitudinal axis, said horse having first, second, and third phalanx bones, $P_{\overline{i}}$, $P_{\overline{ii}}$, and $P_{\overline{iii}}$, respectively, said $P_{\overline{iii}}$ having a dorsal surface thereon and partially rotating, with respect to said $P_{\overline{ii}}$, about an axis of articulation substantially transverse to said longitudinal axis, said horseshoe having an upper surface and a lower surface, and a toe portion having a front surface and an inner surface, comprising:
1. said front surface of said toe portion:
   a. making a substantially obtuse angle with said lower surface at a balance point; and
   b. being configured so that said balance point is located, when said horseshoe is affixed to said distal surface, at the intersection of:

I. said lower surface, and
  II. a plane:
    A. containing said axis of articulation; and
    B. extending downwardly and forwardly therefrom parallel to said dorsal surface along said longitudinal axis;
 2. said upper surface being substantially planar.

2. A horseshoe, to be affixed to the distal surface of a horse's hoof, said hoof having a longitudinal axis, and said horse having first, second, and third phalanx bones, $P\overline{i}$, $P\overline{ii}$, and $P\overline{iii}$, respectively;
  A. said $P\overline{iii}$;
    1. having a dorsal surface thereon;
    2. rotating, with respect to $P\overline{ii}$, about an axis of articulation substantially transverse to said longitudinal axis;
  B. said horseshoe having an upper surface, a lower surface, and a toe portion having a front surface and an inner surface, comprising:
    1. said front surface of said toe portion:
      a. making a substantially obtuse angle with said lower surface at a balance point; and
      b. being configured so that said balance point is located, when said horseshoe is affixed to said distal surface, at the intersection of:
        I. said lower surface, and
        II. a plane which contains said axis of articulation and extends downwardly and forwardly therefrom parallel to said dorsal surface along said longitudinal axis;
    2. said upper surface being substantially planar; and
    3. said inner surface of said toe portion, on the longitudinal axis of the horseshoe, is substantially perpendicular to said lower surface.

3. The horseshoe of claim 2, wherein an insert, of a substance having substantially greater abrasion resistance than the material of said horseshoe, is inserted therein substantially at said balance point thereof.

4. The horseshoe of claim 3, wherein said insert is substantially straight.

5. The horseshoe of claim 3, wherein said insert is curved, with the center thereof lying on said intersection and said longitudinal axis.

6. A horseshoe, to be affixed to the distal surface of a hoof of a horse, said hoof having a longitudinal axis, and said horse having first second, and third phalanx bones, $P\overline{i}$, $P\overline{ii}$, and $P\overline{iii}$, respectively;
  A. said $P\overline{iii}$:
    I. having a dorsal surface thereon;
    II. rotating, with respect to $P\overline{ii}$, about an axis of articulation substantially transverse to said longitudinal axis;
  B. said horseshoe having an upper surface, a lower surface, and a toe portion, and having a front surface and an inner surface, comprising:
    1. said front surface of said toe portion:
      a. making a substantially obtuse angle with said lower surface at a balance point; and
      b. being configured so that said balance point is located, when said horseshoe is affixed to said distal surface, at the intersection of:
        i. said lower surface, and
        ii. a plane which contains said axis of articulation and extends downwardly and forwardly therefrom parallel to said dorsal surface along said longitudinal axis;
    2. an insert having a curve therein of a substance having substantially greater abrasion resistance than the material of said horseshoe being inserted in said lower surface substantially at said balance point thereof, with the center of said curve being located on said longitudinal axis.

7. A horseshoe, to be affixed to the distal surface of a horse's hoof, said hoof having a longitudinal axis, and said horse having first, second, and third phalanx bones, $P\overline{i}$, $P\overline{ii}$, and $P\overline{iii}$, respectively;
  I. said $P\overline{iii}$:
    a. having a dorsal surface thereon;
    b. rotating, with respect to $P\overline{ii}$, about an axis of articulation substantially transverse to said longitudinal axis;
  C. said horseshoe having an upper surface, a lower surface, and a toe portion:
  I. having a front surface and an inner surface, comprising:
    1. said front surface of said toe portion:
      a. making a substantially obtuse angle with said lower surface at a balance point; and
      b. being configured so that said balance point is located, when said horseshoe is affixed to said distal surface, at the intersection of:
        I. said lower surface, and
        II. a plane which contains said axis of articulation and extends downwardly and forwardly therefrom parallel to said dorsal surface along said longitudinal axis;
    2. said upper surface being substantially planar;
    3. said inner surface of said toe portion, on the longitudinal axis of the horseshoe, being substantially perpendicular to said lower surface; and
    3. a curved insert of a substance having substantially greater abrasion resistance than the material of said horseshoe, being located in said lower surface substantially at said balance point thereof, the center of said curved insert being at said intersection on said longitudinal axis.

8. In a horseshoe to be affixed to the distal surface of a horse's hoof, said hoof having a longitudinal axis, and said horseshoe including:
  I. an upper surface and a lower surface:
    A. a toe portion having:
      1. a front surface and an inner surface;
  II. said horse's hoof:
    A. including first, second and third phalanx bones $P\overline{i}$, $P\overline{ii}$ and $P\overline{iii}$, respectively;
      1. said $P\overline{iii}$ having a dorsal surface thereon; and
    B. rotating, with respect to $P\overline{ii}$, about an axis of articulation substantially transverse to said longitudinal axis: the improvement comprising:
      a. said inner surface, on the longitudinal axis of the horseshoe, being substantially perpendicular to said lower surface;
      b. said upper surface being substantially planar;
      c. said front surface of said toe portion making a substantially obtuse angle .with said lower surface at a balance point:
        1. said balance point being located, when said horseshoe is affixed to said distal surface, at:
          A. the intersection of said lower surface, and
          B. a plane:
            I. containing said axis of articulation;
            II. extending downwardly and forwardly therefrom parallel to said dorsal surface along said hoof's longitudinal axis;
      d. said horseshoe having a curved insert being:
        1. located substantially at said balance point;

2. of a substance having substantially greater abrasion resistance than the material of said horseshoe; and 3. the center of said curved insert being located at said intersection on said longitudinal axis.

9. The horseshoe of claim 5, 6 7 or 8, wherein said insert is substantially normal to said longitudinal axis.

10. The horseshoe of claim 5, 6, 7, or 8, wherein said shoe has arms extending rearwardly from said toe portion and terminating in heel ends, said heel ends being widened to receive a threaded plug inserted therein.

11. The horseshoe of claim 10, wherein a traction calk is inserted into said threaded plug.

12. The horseshoe of claim 10, wherein a blank plug is inserted into said threaded plug to prevent debris from clogging said threaded plug.

* * * * *